US010226681B2

United States Patent
Thornton et al.

(10) Patent No.: US 10,226,681 B2
(45) Date of Patent: Mar. 12, 2019

(54) GOLF CLUBS AND GOLF CLUB HEADS HAVING A PLURALITY OF SENSORS FOR DETECTING ONE OR MORE SWING PARAMETERS

(71) Applicant: NIKE, Inc., Beaverton, OR (US)

(72) Inventors: Douglas A. Thornton, Columbus, OH (US); Jeffrey A. Hadden, Columbus, OH (US); Bradley C. Glenn, Columbus, OH (US)

(73) Assignee: NIKE, Inc., Beaverton, OR (US)

( * ) Notice: Subject to any disclaimer, the term of this patent is extended or adjusted under 35 U.S.C. 154(b) by 84 days.

(21) Appl. No.: 15/144,514

(22) Filed: May 2, 2016

(65) Prior Publication Data
US 2017/0312609 A1   Nov. 2, 2017

(51) Int. Cl.
A63B 69/36 (2006.01)
A63B 60/46 (2015.01)
A63B 24/00 (2006.01)
G09B 19/00 (2006.01)

(52) U.S. Cl.
CPC .......... *A63B 69/36* (2013.01); *A63B 24/0003* (2013.01); *A63B 60/46* (2015.10); *G09B 19/0038* (2013.01); *A63B 2208/0204* (2013.01); *A63B 2220/40* (2013.01); *A63B 2220/803* (2013.01); *A63B 2220/833* (2013.01)

(58) Field of Classification Search
None
See application file for complete search history.

(56) References Cited

U.S. PATENT DOCUMENTS

| | | |
|---|---|---|
| 3,270,564 A | 9/1966 | Evans |
| 3,788,647 A | 1/1974 | Evans |
| 3,792,863 A | 2/1974 | Evans |
| 3,806,131 A | 4/1974 | Evans |
| 3,945,646 A | 3/1976 | Hammond |
| 4,898,389 A | 2/1990 | Plutt |
| 4,940,236 A | 7/1990 | Allen |
| 4,991,850 A | 2/1991 | Wilhlem |
| 5,221,088 A | 6/1993 | McTeigue et al. |
| 5,233,544 A | 8/1993 | Kobayashi |
| 5,245,537 A | 9/1993 | Barber |

(Continued)

FOREIGN PATENT DOCUMENTS

| | | |
|---|---|---|
| CA | 2139690 A1 | 7/1996 |
| CN | 2411030 Y | 12/2000 |

(Continued)

OTHER PUBLICATIONS

Jul. 6, 2017—WO (ISR)—App. No. PCT/US17/030028.

*Primary Examiner* — Damon Pierce
(74) *Attorney, Agent, or Firm* — Banner & Witcoff, Ltd.

(57) ABSTRACT

A golf club having a sensor that is releasably connected is disclosed, where the sensor comprises a plurality of inertial measurement units. Each inertial measurement unit is able to measure linear accelerations along three orthogonal axes and angular rates of rotation along the same three orthogonal axes. Each inertial measurement unit is positioned such that at least two of the axes of each inertial measurement unit are oriented differently. Additionally, a process may be implemented by a processor to expand the measurement range of the sensor.

4 Claims, 10 Drawing Sheets

(56) References Cited

U.S. PATENT DOCUMENTS

| | | |
|---|---|---|
| 5,332,225 A | 7/1994 | Ura |
| 5,354,063 A | 10/1994 | Curchod |
| 5,364,093 A | 11/1994 | Huston et al. |
| 5,372,365 A | 12/1994 | McTeigue et al. |
| 5,413,345 A | 5/1995 | Nauck |
| 5,429,327 A | 7/1995 | Adams |
| 5,441,269 A | 8/1995 | Henwood |
| 5,478,082 A | 12/1995 | De Knight et al. |
| 5,507,485 A | 4/1996 | Fisher |
| 5,524,081 A | 6/1996 | Paul |
| 5,616,832 A | 4/1997 | Nauck |
| 5,634,855 A | 6/1997 | King |
| 5,681,993 A | 10/1997 | Heitman |
| 5,718,641 A | 2/1998 | Lin |
| 5,724,265 A | 3/1998 | Hutchings |
| 5,728,006 A | 3/1998 | Teitell et al. |
| 5,779,555 A | 7/1998 | Nomura et al. |
| 5,792,000 A | 8/1998 | Weber et al. |
| 5,792,001 A | 8/1998 | Henwood |
| 5,826,874 A | 10/1998 | Teitell et al. |
| 5,951,410 A | 9/1999 | Butler et al. |
| 5,955,667 A | 9/1999 | Fyfe |
| 5,973,596 A | 10/1999 | French et al. |
| 6,012,988 A | 1/2000 | Burke |
| 6,018,705 A | 1/2000 | Gaudet et al. |
| 6,044,704 A | 4/2000 | Sacher |
| 6,045,364 A | 4/2000 | Dugan et al. |
| 6,052,654 A | 4/2000 | Gaudet et al. |
| 6,196,932 B1 | 3/2001 | Marsh et al. |
| 6,224,493 B1 | 5/2001 | Lee et al. |
| 6,248,021 B1 | 6/2001 | Ognjanovic |
| 6,261,102 B1 | 7/2001 | Dugan et al. |
| 6,270,422 B1 | 8/2001 | Fisher |
| 6,299,553 B1 | 10/2001 | Petuchowski et al. |
| 6,402,634 B2 | 6/2002 | Lee et al. |
| 6,413,167 B1 | 7/2002 | Burke |
| 6,430,843 B1 | 8/2002 | Potter et al. |
| 6,431,990 B1 | 8/2002 | Manwaring |
| 6,441,745 B1 | 8/2002 | Gates |
| 6,456,938 B1 | 9/2002 | Barnard |
| 6,561,917 B2 | 5/2003 | Manwaring |
| 6,579,190 B2 | 6/2003 | Yamamoto |
| 6,607,450 B1 | 8/2003 | Hackman |
| 6,638,175 B2 | 10/2003 | Lee et al. |
| 6,648,769 B2 | 11/2003 | Lee et al. |
| 6,697,820 B1 | 2/2004 | Tarlie |
| 6,757,572 B1 | 6/2004 | Forest |
| 6,802,772 B1 | 10/2004 | Kunzle et al. |
| 6,819,247 B2 | 11/2004 | Bimbach et al. |
| 6,821,209 B2 | 11/2004 | Manwaring et al. |
| 6,876,947 B1 | 4/2005 | Darley et al. |
| 6,882,955 B1 | 4/2005 | Ohlenbusch et al. |
| 6,900,759 B1 | 5/2005 | Katayama |
| 6,923,729 B2 | 8/2005 | McGinty et al. |
| 6,929,558 B2 | 8/2005 | Manwaring et al. |
| 6,991,552 B2 | 1/2006 | Burke |
| 7,004,848 B2 | 2/2006 | Konow |
| 7,021,140 B2 | 4/2006 | Perkins |
| 7,037,198 B2 | 5/2006 | Hameen-Anttila |
| 7,041,014 B2 | 5/2006 | Wright et al. |
| 7,118,498 B2 | 10/2006 | Meadows et al. |
| 7,121,962 B2 | 10/2006 | Reeves |
| 7,125,340 B1 | 10/2006 | Priester et al. |
| 7,160,200 B2 | 1/2007 | Grober |
| 7,175,177 B2 | 2/2007 | Meifu et al. |
| 7,175,511 B2 | 2/2007 | Ueda et al. |
| 7,214,138 B1 | 5/2007 | Stivers et al. |
| 7,234,351 B2 | 6/2007 | Perkins |
| 7,235,020 B1 | 6/2007 | Christensen |
| 7,264,554 B2 | 9/2007 | Bentley |
| 7,264,555 B2 | 9/2007 | Lee et al. |
| 7,310,895 B2 | 12/2007 | Whittlesey et al. |
| 7,602,301 B1 | 10/2009 | Stirling et al. |
| 7,627,451 B2 | 12/2009 | Vock et al. |
| 7,647,071 B2 | 1/2010 | Rofougaran et al. |
| 7,691,004 B1 | 4/2010 | Lueders |
| 7,736,242 B2 | 6/2010 | Stites et al. |
| 7,771,263 B2 | 8/2010 | Telford |
| 7,780,535 B2 | 8/2010 | Hagood et al. |
| 7,789,742 B1 | 9/2010 | Murdock et al. |
| 7,800,480 B1 | 9/2010 | Joseph et al. |
| 7,801,575 B1 | 9/2010 | Balardeta et al. |
| 7,804,404 B1 | 9/2010 | Balardeta et al. |
| 7,811,182 B2 | 10/2010 | Ligotti, III et al. |
| 7,821,407 B2 | 10/2010 | Shears et al. |
| 7,825,815 B2 | 11/2010 | Shears et al. |
| 7,831,212 B1 | 11/2010 | Balardeta et al. |
| 7,837,574 B2 | 11/2010 | Brunner |
| 7,837,575 B2 | 11/2010 | Lee et al. |
| 7,853,211 B1 | 12/2010 | Balardeta et al. |
| 7,857,705 B1 | 12/2010 | Galloway |
| 7,881,499 B2 | 2/2011 | Bissonnette et al. |
| 7,883,428 B1 | 2/2011 | Balardeta et al. |
| 7,887,440 B2 | 2/2011 | Wright et al. |
| 7,892,102 B1 | 2/2011 | Galloway |
| 7,941,097 B2 | 5/2011 | Balardeta et al. |
| 7,946,926 B1 | 5/2011 | Balardeta et al. |
| 7,957,767 B2 | 6/2011 | Rofougaran |
| 7,978,081 B2 | 7/2011 | Shears et al. |
| 8,025,586 B2 | 9/2011 | Teramoto |
| 8,052,539 B2 | 11/2011 | Kimber |
| 8,117,903 B2 | 2/2012 | Golden et al. |
| 8,226,495 B2 | 7/2012 | Savarese et al. |
| 8,330,284 B2 | 12/2012 | Weston et al. |
| 8,337,335 B2 | 12/2012 | Dugan |
| 8,342,978 B2 | 1/2013 | Tamura |
| 8,430,770 B2 | 4/2013 | Dugan |
| 8,465,376 B2 | 6/2013 | Bentley |
| 8,593,286 B2 | 11/2013 | Razoumov et al. |
| 8,696,450 B2 | 4/2014 | Rose et al. |
| 8,715,096 B2 | 5/2014 | Cherbini |
| 8,784,228 B2 | 7/2014 | Morin et al. |
| 8,801,532 B2 | 8/2014 | Katayama |
| 8,840,483 B1 | 9/2014 | Steusloff et al. |
| 8,894,502 B2 | 11/2014 | Rose |
| 8,941,723 B2 | 1/2015 | Bentley et al. |
| 8,994,826 B2 | 3/2015 | Bentley |
| 2001/0005695 A1 | 6/2001 | Lee et al. |
| 2001/0035880 A1 | 11/2001 | Musatov et al. |
| 2001/0053720 A1 | 12/2001 | Lee et al. |
| 2002/0004723 A1 | 1/2002 | Meifu et al. |
| 2002/0019677 A1 | 2/2002 | Lee |
| 2002/0049507 A1 | 4/2002 | Hameen-Anttila |
| 2002/0052246 A1 | 5/2002 | Burke |
| 2002/0052750 A1 | 5/2002 | Hirooka |
| 2002/0072815 A1 | 6/2002 | McDonough et al. |
| 2002/0077189 A1 | 6/2002 | Tuer et al. |
| 2002/0082775 A1 | 6/2002 | Meadows et al. |
| 2002/0107085 A1 | 8/2002 | Lee et al. |
| 2002/0123386 A1 | 9/2002 | Perlmutter |
| 2002/0151994 A1 | 10/2002 | Sisco |
| 2002/0160848 A1 | 10/2002 | Burke |
| 2002/0173364 A1 | 11/2002 | Boscha |
| 2002/0173365 A1 | 11/2002 | Boscha |
| 2002/0183657 A1 | 12/2002 | Socci et al. |
| 2003/0008722 A1 | 1/2003 | Konow |
| 2003/0009913 A1 | 1/2003 | Potter et al. |
| 2003/0014134 A1 | 1/2003 | Morgan |
| 2003/0036436 A1 | 2/2003 | Casanova et al. |
| 2003/0040380 A1 | 2/2003 | Wright et al. |
| 2003/0132844 A1 | 7/2003 | Walker |
| 2003/0191547 A1 | 10/2003 | Morse |
| 2003/0207718 A1 | 11/2003 | Perlmutter |
| 2004/0067797 A1 | 4/2004 | Knecht |
| 2004/0106460 A1 | 6/2004 | Lee et al. |
| 2004/0142603 A1 | 7/2004 | Walker |
| 2004/0177531 A1 | 9/2004 | DiBenedetto et al. |
| 2004/0204257 A1 | 10/2004 | Boscha et al. |
| 2004/0225199 A1 | 11/2004 | Evanyk et al. |
| 2004/0259651 A1 | 12/2004 | Storek |
| 2005/0017454 A1 | 1/2005 | Endo et al. |
| 2005/0032582 A1 | 2/2005 | Mahajan et al. |
| 2005/0037862 A1 | 2/2005 | Hagood et al. |
| 2005/0043109 A1 | 2/2005 | Buckley et al. |

(56) References Cited

U.S. PATENT DOCUMENTS

| | | |
|---|---|---|
| 2005/0054457 A1 | 3/2005 | Eyestone et al. |
| 2005/0079922 A1 | 4/2005 | Priester et al. |
| 2005/0096761 A1 | 5/2005 | Hanover et al. |
| 2005/0188566 A1 | 9/2005 | Whittlesey et al. |
| 2005/0215340 A1 | 9/2005 | Stites et al. |
| 2005/0227775 A1 | 10/2005 | Cassady et al. |
| 2005/0240294 A1 | 10/2005 | Jones et al. |
| 2005/0261073 A1 | 11/2005 | Farrington et al. |
| 2005/0282650 A1 | 12/2005 | Miettinen et al. |
| 2005/0288119 A1 | 12/2005 | Wang et al. |
| 2006/0025229 A1 | 2/2006 | Mahajan et al. |
| 2006/0029916 A1 | 2/2006 | Boscha |
| 2006/0040757 A1 | 2/2006 | Rosselli |
| 2006/0052173 A1 | 3/2006 | Telford |
| 2006/0063600 A1 | 3/2006 | Grober |
| 2006/0084516 A1 | 4/2006 | Eyestone et al. |
| 2006/0089845 A1 | 4/2006 | Marcell et al. |
| 2006/0094520 A1 | 5/2006 | Kostuj |
| 2006/0105849 A1 | 5/2006 | Brunner |
| 2006/0105853 A1 | 5/2006 | Glass |
| 2006/0109116 A1 | 5/2006 | Keays |
| 2006/0122002 A1 | 6/2006 | Konow |
| 2006/0166737 A1 | 7/2006 | Bentley |
| 2006/0166738 A1 | 7/2006 | Eyestone et al. |
| 2006/0184336 A1 | 8/2006 | Kolen |
| 2006/0194178 A1 | 8/2006 | Goldstein |
| 2006/0199659 A1 | 9/2006 | Caldwell |
| 2006/0224306 A1 | 10/2006 | Workman et al. |
| 2006/0276256 A1 | 12/2006 | Storek |
| 2006/0287118 A1 | 12/2006 | Wright et al. |
| 2007/0006489 A1 | 1/2007 | Case et al. |
| 2007/0010341 A1 | 1/2007 | Miettinen et al. |
| 2007/0011919 A1 | 1/2007 | Case |
| 2007/0087866 A1 | 4/2007 | Meadows et al. |
| 2007/0111811 A1 | 5/2007 | Grober |
| 2007/0129178 A1 | 6/2007 | Reeves |
| 2007/0135225 A1 | 6/2007 | Nieminen et al. |
| 2007/0135237 A1 | 6/2007 | Reeves |
| 2007/0191126 A1 | 8/2007 | Mandracken |
| 2007/0238538 A1 | 10/2007 | Priester |
| 2007/0270214 A1 | 11/2007 | Bentley |
| 2008/0039222 A1 | 2/2008 | Kiraly |
| 2008/0051208 A1 | 2/2008 | Lee et al. |
| 2008/0076580 A1 | 3/2008 | Murdock et al. |
| 2008/0085778 A1 | 4/2008 | Dugan |
| 2008/0085788 A1 | 4/2008 | Rainer et al. |
| 2008/0125288 A1 | 5/2008 | Case |
| 2008/0188310 A1 | 8/2008 | Murdock |
| 2008/0200275 A1 | 8/2008 | Wagen et al. |
| 2008/0218343 A1 | 9/2008 | Lee et al. |
| 2008/0242354 A1 | 10/2008 | Rofougaran |
| 2008/0287205 A1 | 11/2008 | Katayama |
| 2008/0318703 A1 | 12/2008 | Mooney |
| 2009/0018795 A1 | 1/2009 | Priester et al. |
| 2009/0048070 A1 | 2/2009 | Vincent et al. |
| 2009/0111602 A1 | 4/2009 | Savarese et al. |
| 2009/0120197 A1 | 5/2009 | Golden et al. |
| 2009/0131190 A1 | 5/2009 | Kimber |
| 2009/0131191 A1 | 5/2009 | Priester et al. |
| 2009/0163285 A1 | 6/2009 | Kwon et al. |
| 2009/0165530 A1 | 7/2009 | Golden et al. |
| 2009/0165531 A1 | 7/2009 | Golden et al. |
| 2009/0203460 A1 | 8/2009 | Clark |
| 2009/0209358 A1 | 8/2009 | Niegowski |
| 2009/0247312 A1 | 10/2009 | Sato et al. |
| 2009/0254204 A1 | 10/2009 | Kostuj |
| 2009/0260426 A1 | 10/2009 | Lieberman et al. |
| 2009/0270743 A1 | 10/2009 | Dugan et al. |
| 2010/0048314 A1 | 2/2010 | Hsu et al. |
| 2010/0049468 A1 | 2/2010 | Papadourakis |
| 2010/0063778 A1 | 3/2010 | Schrock et al. |
| 2010/0063779 A1 | 3/2010 | Schrock et al. |
| 2010/0067566 A1 | 3/2010 | Rofougaran et al. |
| 2010/0093457 A1 | 4/2010 | Ahem et al. |
| 2010/0093458 A1 | 4/2010 | Davenport et al. |
| 2010/0099509 A1 | 4/2010 | Ahem et al. |
| 2010/0113174 A1 | 5/2010 | Ahem |
| 2010/0117837 A1 | 5/2010 | Stirling et al. |
| 2010/0121227 A1 | 5/2010 | Stirling et al. |
| 2010/0121228 A1 | 5/2010 | Stirling et al. |
| 2010/0130298 A1 | 5/2010 | Dugan et al. |
| 2010/0144455 A1 | 6/2010 | Ahem |
| 2010/0144456 A1 | 6/2010 | Ahem |
| 2010/0154255 A1 | 6/2010 | Robinson et al. |
| 2010/0201512 A1 | 8/2010 | Stirling et al. |
| 2010/0210371 A1 | 8/2010 | Sato et al. |
| 2010/0216563 A1 | 8/2010 | Stites et al. |
| 2010/0216564 A1 | 8/2010 | Stites et al. |
| 2010/0216565 A1 | 8/2010 | Stites et al. |
| 2010/0222152 A1 | 9/2010 | Jaekel et al. |
| 2010/0255922 A1 | 10/2010 | Lueders |
| 2010/0304877 A1 | 12/2010 | Iwahashi et al. |
| 2010/0308105 A1 | 12/2010 | Savarese et al. |
| 2011/0028230 A1 | 2/2011 | Balardeta et al. |
| 2011/0053698 A1 | 3/2011 | Stites et al. |
| 2011/0081978 A1 | 4/2011 | Murdock et al. |
| 2011/0082571 A1 | 4/2011 | Murdock et al. |
| 2011/0087344 A1 | 4/2011 | Murdock et al. |
| 2011/0092260 A1 | 4/2011 | Murdock et al. |
| 2011/0130223 A1 | 6/2011 | Murdock et al. |
| 2011/0151977 A1 | 6/2011 | Murdock et al. |
| 2011/0212757 A1 | 9/2011 | Murdock et al. |
| 2011/0224011 A1 | 9/2011 | Denton et al. |
| 2011/0224025 A1 | 9/2011 | Balardeta et al. |
| 2011/0230273 A1 | 9/2011 | Niegowski et al. |
| 2011/0281621 A1 | 11/2011 | Murdock et al. |
| 2011/0306435 A1 | 12/2011 | Seo |
| 2012/0019140 A1 | 1/2012 | Maxik et al. |
| 2012/0052972 A1 | 3/2012 | Bentley |
| 2012/0120572 A1 | 5/2012 | Bentley |
| 2012/0191405 A1 | 7/2012 | Molyneux et al. |
| 2012/0289354 A1 | 11/2012 | Cottam et al. |
| 2013/0041590 A1 | 2/2013 | Burich et al. |
| 2013/0065711 A1 | 3/2013 | Ueda et al. |
| 2013/0260922 A1 | 10/2013 | Yontz et al. |
| 2013/0324274 A1 | 12/2013 | Stites |
| 2014/0228649 A1 | 8/2014 | Rayner et al. |
| 2014/0323235 A1 | 10/2014 | Stites et al. |
| 2014/0364246 A1 | 12/2014 | Davenport |
| 2014/0379295 A1* | 12/2014 | Sato ............... G09B 19/003 702/142 |

FOREIGN PATENT DOCUMENTS

| | | |
|---|---|---|
| CN | 2487416 Y | 4/2002 |
| CN | 2688331 Y | 3/2005 |
| CN | 1984698 A | 6/2007 |
| CN | 101352609 A | 1/2009 |
| CN | 101918090 A | 12/2010 |
| CN | 101927084 A | 12/2010 |
| DE | 202007013632 U1 | 12/2007 |
| EP | 2332619 A1 | 6/2011 |
| JP | S62176470 A | 8/1987 |
| JP | H03-60680 A | 3/1991 |
| JP | H0355077 A | 3/1991 |
| JP | H06237 | 1/1994 |
| JP | H08000785 | 1/1996 |
| JP | H08131599 A | 5/1996 |
| JP | H08173586 | 7/1996 |
| JP | 2001264016 A | 9/2001 |
| JP | 2006247023 A | 9/2006 |
| JP | 2008506421 A | 3/2008 |
| JP | 2008073210 A | 4/2008 |
| JP | 2008289866 A | 12/2008 |
| JP | 2009534546 A | 9/2009 |
| JP | 06000237 B2 | 9/2016 |
| KR | 20060090501 A | 8/2006 |
| KR | 1020060114969 | 11/2006 |
| KR | 20070095407 A | 9/2007 |
| KR | 20090129246 A | 12/2009 |
| KR | 20100020131 A | 2/2010 |
| KR | 20100051153 A | 5/2010 |
| KR | 20100095917 A | 9/2010 |
| KR | 101002846 B1 | 12/2010 |

(56) References Cited

FOREIGN PATENT DOCUMENTS

| | | | |
|---|---|---|---|
| KR | 20110005247 | A | 1/2011 |
| WO | 1999065574 | A2 | 12/1999 |
| WO | 0215993 | A1 | 2/2002 |
| WO | 2004056425 | A2 | 7/2004 |
| WO | 2005094953 | A2 | 10/2005 |
| WO | 2005118086 | A1 | 12/2005 |
| WO | 2006014459 | A2 | 2/2006 |
| WO | 2012027726 | A2 | 3/2012 |
| WO | 2012138543 | A2 | 10/2012 |
| WO | 2012149385 | A1 | 11/2012 |
| WO | 2016054249 | A1 | 4/2016 |

* cited by examiner

GOLF CLUBS AND GOLF CLUB HEADS HAVING A PLURALITY OF SENSORS FOR DETECTING ONE OR MORE SWING PARAMETERS

TECHNICAL FIELD

Aspects of this disclosure generally relate to golf clubs and golf club heads. More particularly, aspects of this disclosure relate to golf clubs and golf club heads having a plurality of sensors for detecting one or more swing parameters.

BACKGROUND

Golf is enjoyed by a wide variety of players—players of different genders and dramatically different ages and/or skill levels. Golf is somewhat unique in the sporting world in that such diverse collections of players can play together in golf events, even in direct competition with one another (e.g., using handicapped scoring, different tee boxes, in team formats, etc.), and still enjoy the golf outing or competition. These factors, together with the increased availability of golf programming on television (e.g., golf tournaments, golf news, golf history, and/or other golf programming) and the rise of well-known golf superstars, at least in part, have increased golf's popularity in recent years, both in the United States and across the world.

Golfers at all skill levels seek to improve their performance, lower their golf scores, and reach that next performance "level." Manufacturers of all types of golf equipment have responded to these demands, and in recent years, the industry has witnessed dramatic changes and improvements in golf equipment. For example, a wide range of different golf ball and club models now are available, with balls designed to complement specific swing speeds and/or other player characteristics or preferences, e.g., with some balls designed to fly farther and/or straighter; some designed to provide higher or flatter trajectories; some designed to provide more spin, control, and/or feel (particularly around the greens); some designed for faster or slower swing speeds; etc. Additionally, the market has seen dramatic changes and improvements in putter designs, golf club head designs, shafts, and grips in recent years. Further, other technological advancements have been made in an effort to better match the various elements and/or characteristics of the golf club and characteristics of a golf ball to a particular user's swing features or characteristics In addition to the golf equipment, the mechanics of the golf swing itself are also of interest to the player eager to improve his/her performance. Qualitative evaluation of a user's swing by a trained golfing professional has traditionally been helpful in correcting certain errors and honing skills of players of all experience levels.

As technology has evolved, the capability to mount sensors onto a golf club or other swinging device has become available. However, the speed at which a golfer may swing a golf club can generate motions that may not be measured accurately because the forces created by the swing may exceed the sensor's measurement capability. Thus, a means to increase the measurement capability and increase accuracy of the measurements would be welcome in the art.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure may relate to a golf club comprising: a shaft having a first end connected to a golf club head and a second end connected to a grip; a sensor connected to the golf club, where the sensor comprises a first inertial measurement unit and a second inertial measurement unit. The first inertial measurement unit may be capable of measuring linear accelerations in a first axis, a second axis, and a third axis and angular rates of rotation about the first axis, the second axis, and the third axis, where the first axis, the second axis, and the third axis are orthogonally oriented. The second inertial measurement unit may be capable of measuring linear accelerations in a fourth axis, a fifth axis, and a sixth axis and angular rates of rotation about the fourth axis, the fifth axis, and the sixth axis, where the fourth axis, the fifth axis, and the sixth axis are orthogonally oriented. The first axis and the second axis of the first inertial measurement unit are oriented at an angle to the fourth axis and the fifth axis of the second inertial measurement unit. The first axis and the second axis of the first inertial measurement unit may be oriented at an angle of 45 degrees from the sixth axis of the second inertial measurement unit.

In another aspect, this disclosure may include at least one axis of the first inertial measurement unit oriented in the same direction as at least one axis of the second inertial measurement unit. Also, the sensor may be positioned near the grip end of the golf club or may be connected to the golf club head. Additionally, a plurality of sensors, each having at least one inertial measurement unit, may be positioned on the golf club. The sensor may be releasably connected to the golf club.

Another aspect may also relate to the sensor having the first inertial measurement unit mounted to a first circuit card assembly and the second inertial measurement unit mounted to a second circuit card assembly. The first circuit card assembly is perpendicularly oriented to the second circuit card assembly. In addition, the first circuit card assembly may comprise a processor and a power source. Lastly, a housing may be provided, which has a first mounting surface, and a second mounting surface oriented perpendicular to the first mounting surface, where the first circuit card assembly may be connected to the first mounting surface and the second circuit card assembly may be connected to the second mounting surface.

In yet another aspect, this disclosure relates to a golf club comprising: a shaft and a golf club head, the shaft having a first end connected to the golf club head and a second end connected to a grip; a sensor connected to a golf club, where the sensor comprises a first inertial measurement unit, a second inertial measurement unit, and a processor; and a non-transitory, computer-readable medium storing computer-executable instructions that, when executed by the processor, causes the processor to at least: receive angular rate of rotation measurements about a first axis, a second axis, and a third axis from the first inertial measurement unit; where the first inertial measurement unit may be capable of measuring linear accelerations in the first axis, the second axis, and the third axis and angular rates of rotation about the first axis, the second axis, and the third axis, where the first axis, the second axis, and the third axis are orthogonally oriented; compare the angular rate of rotation measurements from the first inertial measurement unit to a predetermined set of parameters; receive angular rate of rotation measurements about a fourth axis, a fifth axis, and a sixth axis from the second inertial measurement unit; where the second inertial measurement unit may be capable of measuring linear accelerations in the fourth axis, the fifth axis, and the sixth axis and angular rates of rotation about the fourth axis, the fifth axis, and the sixth axis, wherein the fourth axis, the fifth axis, and the sixth axis are orthogonally oriented; calculate angular rate of rotation measurements about a first virtual axis, a second virtual axis, and a third virtual axis, wherein the first virtual axis, the second virtual axis, and the third virtual axis may be the same orientation as the first axis, the second axis and the third axis of the first inertial measurement unit; and output the angular rate of rotation measurements of the first virtual axis, the second virtual axis, and the third virtual axis. The first axis and the second axis of the first inertial measurement unit may be oriented at an angle of 45 degrees from the sixth axis of the second inertial measurement unit. Also, at least one axis of the first inertial measurement unit may be oriented in the same direction as at least one axis of the second inertial measurement unit. The predetermined set of parameters may include a saturation limit for the angular rate of rotation measurement.

Yet another aspect of this disclosure may relate to a golf club comprising: a shaft and a golf club head, the shaft having a first end connected to the golf club head and a second end connected to a grip; a sensor connected to the golf club, where the sensor comprises a first inertial measurement unit, a second inertial measurement unit, and a processor; and a non-transitory, computer-readable medium storing computer-executable instructions that when executed by the processor, causes the processor to at least: receive angular rate of rotation measurements about a first axis, a second axis, and a third axis from a first inertial measurement unit; where the first inertial measurement unit is capable of measuring linear accelerations in the first axis, the second axis, and the third axis and angular rates of rotation about the first axis, the second axis, and the third axis, wherein the first axis, the second axis, and the third axis are orthogonally oriented; receive angular rate of rotation measurements about a fourth axis, a fifth axis, and a sixth axis from a second inertial measurement unit; wherein the second inertial measurement unit may be capable of measuring linear accelerations in the fourth axis, the fifth axis, and the sixth axis and angular rates of rotation about the fourth axis, the fifth axis, and the sixth axis, where the fourth axis, the fifth axis, and the sixth axis are orthogonally oriented; calculate angular rate of rotation measurements about a first virtual axis, a second virtual axis, and a third virtual axis, where the first virtual axis, the second virtual axis, and the third virtual axis may have the same orientation as the first axis, the second axis and the third axis of the first inertial measurement unit; and calculate a divergence of the angular rate of rotation about the first axis, the second axis, and the third axis of the first inertial measurement unit and the angular rate of rotation about the first virtual axis, the second virtual axis, and the third virtual axis; calculate a gyroscopic bias drift of the angular rate of rotation measurement about the first axis, the second axis and the third axis of the first inertial measurement unit; and output the gyroscopic bias drift of the first axis, the second axis and the third axis of the first inertial measurement unit.

Still another aspect of this disclosure may relate to a golf club comprising: a shaft and a golf club head, the shaft having a first end connected to the golf club head and a second end connected to a grip; a sensor connected to the golf club, where the sensor comprises a first inertial measurement unit, a second inertial measurement unit, and a processor; and a non-transitory, computer-readable medium storing computer-executable instructions that when executed by the processor, causes the processor to at least: receive linear acceleration and angular rate of rotation measurements about a first axis, a second axis, and a third axis from the first inertial measurement unit; where the first inertial measurement unit may be capable of measuring linear accelerations in the first axis, the second axis, and the third axis and angular rates of rotation about the first axis, the second axis, and the third axis, where the first axis, the second axis, and the third axis are orthogonally oriented; receive linear acceleration and angular rate of rotation measurements about a fourth axis, a fifth axis, and a sixth axis from the second inertial measurement unit; where the second inertial measurement unit may be capable of measuring linear accelerations in the fourth axis, the fifth axis, and the sixth axis and angular rates of rotation about the fourth axis, the fifth axis, and the sixth axis, where the fourth axis, the fifth axis, and the sixth axis are orthogonally oriented; calculate linear acceleration and angular rate of rotation measurements about a first virtual axis, a second virtual axis, and a third virtual axis, where the first virtual axis, the second virtual axis, and the third virtual axis may have the same orientation as the first axis, the second axis and the third axis of the first inertial measurement unit; and calculate an average of the linear acceleration and the angular rate of rotation measurements about the first axis, the second axis, and the third axis of the first inertial measurement unit with the linear acceleration and angular rate of rotation measurements about the first virtual axis, the second virtual axis, and the third virtual axis; and output the average of the linear acceleration and the angular rate of rotation measurements.

In addition, another aspect of this disclosure may relate to a golf club comprising: a shaft and a golf club head, the shaft having a first end connected to the golf club head and a second end connected to a grip; a sensor connected to the golf club, where the sensor comprises a first inertial measurement unit, a second inertial measurement unit, and a processor; and a non-transitory, computer-readable medium storing computer-executable instructions that, when executed by the processor, cause the processor to at least: receive linear acceleration and angular rate of rotation measurements about a first axis, a second axis, and a third axis from the first inertial measurement unit, where the first inertial measurement unit may be capable of measuring linear accelerations in the first axis, the second axis, and the third axis and angular rates of rotation about the first axis, the second axis, and the third axis; receive linear acceleration and angular rate of rotation measurements about a fourth axis, a fifth axis, and a sixth axis from the second inertial measurement unit, where the second inertial measurement unit may be capable of measuring linear accelerations in the fourth axis, the fifth axis, and the sixth axis and angular rates of rotation about the fourth axis, the fifth axis, and the sixth axis; calculate linear acceleration and angular rate of rotation measurements about a first virtual axis, a second virtual axis, and a third virtual axis, where the first virtual axis, the second virtual axis, and the third virtual axis may be the same orientation as the first axis, the second axis and the third axis of the first inertial measurement unit; and calculate a first noise value about of the linear acceleration and the angular rate of rotation measurements about the first axis, the second axis, and the third axis of the first inertial measurement unit with and calculate a second noise value about the linear acceleration and angular rate of rotation measurements about the first virtual axis, the second virtual axis, and the third virtual axis; and output an average noise of the first noise value and the second noise value about the linear acceleration and the angular rate of rotation measurements.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements.

DETAILED DESCRIPTION

Figure 1:
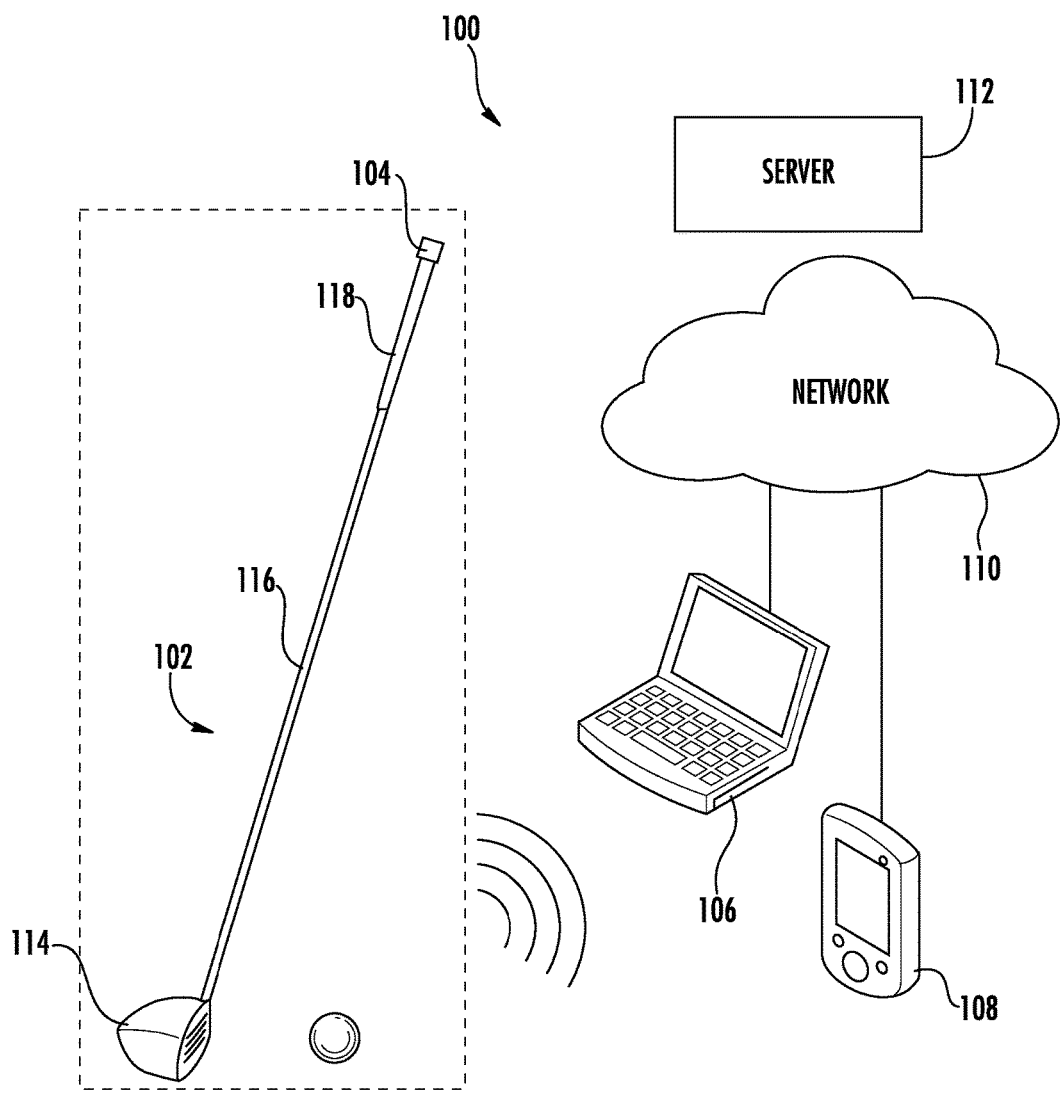
FIG. 1 depicts an example golf analysis system according to one or more aspects described herein.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Ball striking device" means any device constructed and designed to strike a ball or other similar objects (such as a hockey puck). In addition to generically encompassing "ball striking heads," which are described in more detail below, examples of "ball striking devices" include, but are not limited to: golf clubs, putters, croquet mallets, polo mallets, baseball or softball bats, cricket bats, tennis rackets, badminton rackets, field hockey sticks, ice hockey sticks, and the like.

"Ball striking head" (or "head") means the portion of a "ball striking device" that includes and is located immediately adjacent (optionally surrounding) the portion of the ball striking device designed to contact the ball (or other object) in use. In some examples, such as many golf clubs and putters, the ball striking head may be a separate and independent entity from any shaft member, and it may be attached to the shaft in some manner.

The terms "shaft" or "handle" include the portion of a ball striking device (if any) that the user holds during a swing of a ball striking device.

"Substantially perpendicular" means that two elements are oriented at an angle of 90 degrees or within +/−2 percent of 90 degrees.

In general, aspects of this invention relate to sensors relating to golf swing analysis systems or any type of swing analysis system such as baseball, tennis, racquetball, hockey, or any sport that requires a user to have a swinging motion. In general, the swing analysis systems can help a user or coach better by using various numerical analysis, and optionally, computer visualization, of a person's swing may be utilized to identify inefficiencies, or errors, in a user's swing motion. In order to analyze a user's swinging motion, a sensor or plurality of sensors may be positioned on the ball striking device. The sensor may include an inertial measurement unit, or IMU, capable of measuring linear accelerations and angular rates of rotation along and around three orthogonal (mutually-perpendicular) axes. The IMU may comprise a single accelerometer capable of measuring linear accelerations along three orthogonal axes or three accelerometers oriented to measure linear accelerations along three orthogonal axes, and a single gyroscope sensitive to angular velocities about same the three orthogonal axes as the accelerometer, or three gyroscopes sensitive to angular velocities about same the three orthogonal axes as the accelerometer. As discussed in further detail below, output data from one or more of these three accelerometers and/or three gyroscopes may be processed, in order to calculate and describe a motion of a ball striking device during a swing.

However, the dynamic range of acceleration and angular rate data experienced by sporting equipment or people during athletic movements can be quite large. For instance, a golf club during a slow back swing can rotate at approximately 10 degrees per second, while during the down swing the golf club may rotate at approximately 2800 degrees per second. This angular rate range of rotation may exceed the maximum range of the current state of low cost gyroscopes causing the sensor to be "saturated" for a period of time leaving the measurement incomplete. Additionally, a golf swing or a baseball swing typically may move in a primary swing plane, but other planes may see significant rotation as well. The swing planes may be different for different users making it difficult if not impossible to mount a single sensor in an orientation to reduce the risk of saturation.

While it may be possible to increase the range of the sensors, the noise and accuracy of the sensor may be degraded. However, as will be described in further detail below, by adding a redundant set of sensors, mounted off-axis such that each measurement axes is 45 degrees from the other set of sensor's measurement axes, the effective range may be increased without increasing the noise or decreasing the resolution of the sensors. This increased range may be accomplished because the axis that experiences the movement that saturates the measurement will have redundant sensors that measure the same rotation on two other axes oriented at 45 degree angles to the saturated axis. By applying a coordinate transfer rotation matrix to the redundant sensors axis, the range of the axis experiencing the saturation may be increased by creating this virtual axis. Thus, when a movement is sensed that may cause saturation of the axis measurement, the motion processing algorithm can switch to using a virtual sensor axis from the two redundant axes. The measurement range on the virtual axis may be increased by up to 40 percent.

The sensor may include at least two inertial measurement units (IMUs). An individual IMU may be a single a micro-electromechanical systems (MEMS) chip/circuit containing an accelerometer sensitive to linear accelerations along three orthogonal axes, and a gyroscope sensitive to angular rates of rotation or angular velocities about same the three orthogonal axes. Alternatively, the IMU may comprise a plurality of chips/circuits comprising an accelerometer capable of measuring linear accelerations along three orthogonal axes, and a gyroscope capable of measuring angular rates of rotation or angular velocities about same the three orthogonal axes.

The various figures in this application illustrate examples of ball striking devices according to this invention. When the same reference number appears in more than one drawing, that reference number is used consistently in this specification and the drawings refer to the same or similar parts throughout.

FIG. 1 illustrates an example golf analysis system and environment 100 in which various aspects described herein may be used and implemented. Sensor data from one or more sensors may be processed to assess one or more characteristics of a user's golf swing. As such, a golf club 102 may be outfitted a sensor 104 and/or sensors that are removably-coupled or integrally connected to the golf club 102. The sensors 104 may be positioned anywhere on the golf club 102 such as the golf club head 114, the golf club shaft 116, or the golf club grip 118. Additionally, these sensors may be connected on the exterior of the golf club 102 or possibly inside the golf club head 114, inside the golf club shaft 116, under the golf club grip 118, or attached to the end of the golf club grip 118. A plurality of sensors 104 may be connected to the golf club 102 at the same time. For example, a first sensor 104 may be positioned at the grip 118 end of the golf club 102 and a second sensor 104 may be positioned at the golf club head 114, where each of these sensors 104 comprises a plurality of IMUs. This plurality of sensors 104 may be able to provide the player or coach additional useful information, such as shaft flex characteristics during the golf swing. Additionally, the golf club 102 may be any type of golf club, such as a wood-type, hybrid-type, iron-type, or putter.

Data from these sensor or sensors 104 may be processed on-board the golf club 102 such that raw sensor data may be transformed into data describing of one or more motions of a golf club through a swing. Subsequently, this processed data may be communicated to a remote computing device for review and/or further processing. Alternatively, data from the sensors 104 may be communicated as raw sensor data to be processed by a remote computing device, such as devices 106 and/or 108. Accordingly, the golf club 102 may comprise a transceiver configured to allow for wired and/or wireless communication of data between the one or more sensors 104, and the devices 106 and/or 108. In one example, devices 106 and 108 may comprise consumer electronic equipment, such that device 106 may be a personal computer 106 and device 108 may be a mobile communication device 108, such as a tablet computer, a personal data assistant (PDA), a smartphone, and/or combinations thereof. Further, personal computer 106 may include one or more laptop computers or desktop computers. Devices 106 and 108 may be connected, via network 110, to a variety of other devices and destinations, including server 112. As such, devices 106 and 108 may include network interfaces that are either wired or wireless or may have both wired and wireless connection interfaces. Wireless connections may be short range or long range, and may include Wi-Fi, BLUETOOTH, infrared, satellite communications, cellular communications and the like. Some devices (e.g., mobile communication device 108) may include multiple network interfaces and have the capability of transmitting and receiving information over different interfaces depending on a destination/source, time of day, type of information being sent/received and the like. In one example, server 112 may be configured to collect data from various user devices as well as to distribute information such as fitness challenges, golf recommendations, product offers and the like.

As discussed above, the sensor 104 may comprise a plurality of IMUs that each may have a plurality of accelerometers configured to detect linear accelerations along one or more axes, and/or a plurality of gyroscopes, configured to detect angular rates of rotation or angular velocities about one or more axes. Each accelerometer may be able to measure along three orthogonal axes as well as each gyroscope may be able to measure angular rates of rotation or angular velocities about each of same the three orthogonal axes of the accelerometer.

Figure 2:
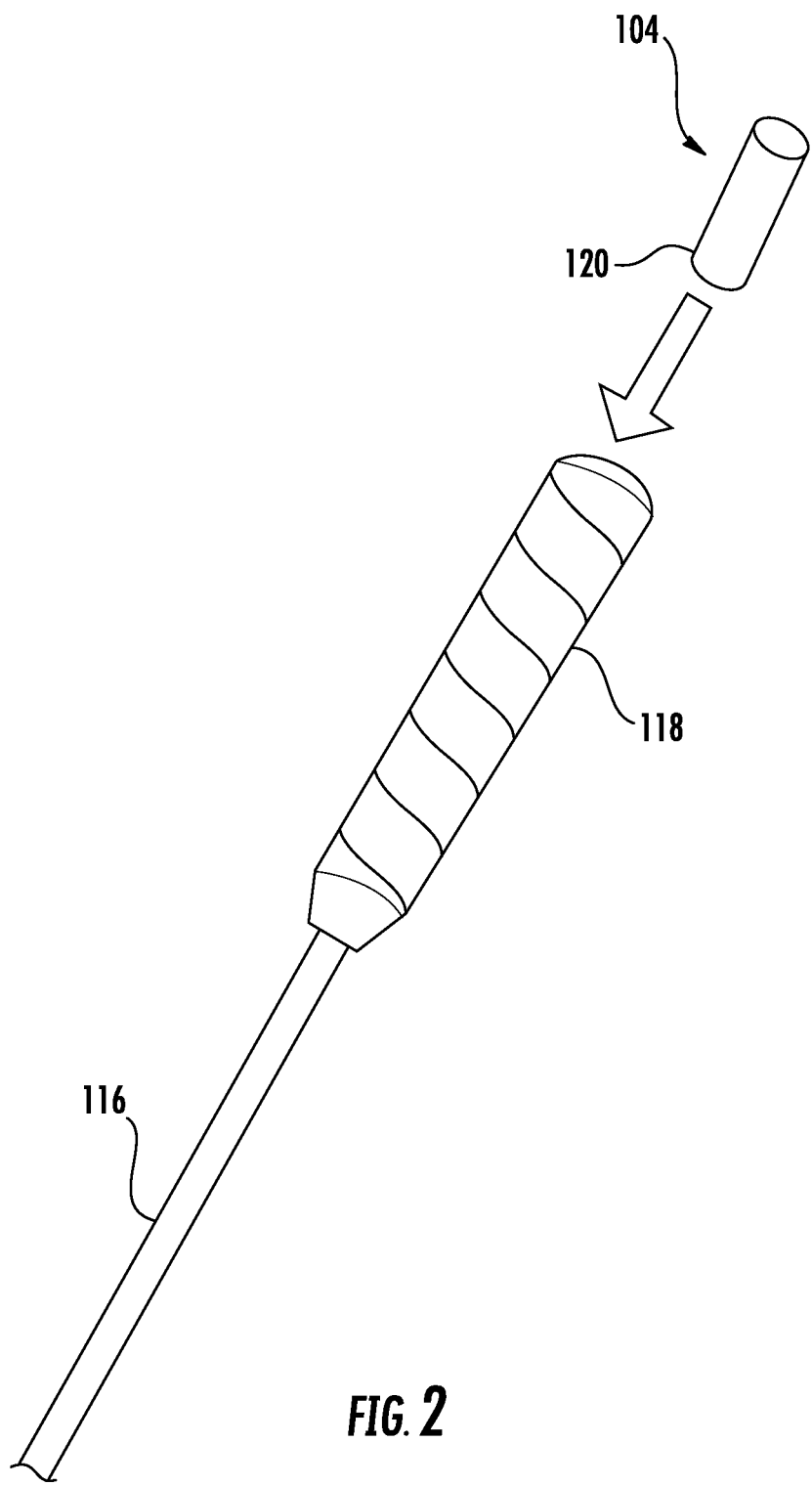
FIG. 2 depicts an perspective view of an example golf club and sensor according to one of more aspects described herein.

As shown in FIG. 2, the sensor 104 may be positioned inside the golf shaft 116 or golf grip 118. The sensor 104 may have a housing 120 to protect the components of the sensor 104 from the environment. The sensor 104 may have any shape required to be effectively house the components and be mounted onto the ball striking device. For example, the sensor 104 may be a cylindrical shape with a height longer than the diameter as shown in FIG. 2, or conversely, the sensor 104 may have a diameter larger than the height. Alternatively, the sensor 104 may be parallelepiped, or any shape sufficient to house the necessary components. In alternate embodiments, the sensor may be relatively flat in order to be attached or adhered to a portion of the golf shaft 116, golf grip 118, or golf club head 114.

The housing 120 may enclose and protect the sensor's components from exposure to the external environment. As such, the housing 120 may comprise any shape, size and/or material configured to protect the sensor components. In one specific example, the housing 120 may comprise a material (e.g. a polymer) configured to allow transmission of radio waves, and such that wireless communication between the sensor 104, and an external computing device, such as device 106 and/or device 108, may be facilitated. In other examples, wired communication between the sensor 104 and another computing device, such as devices 106 and 108, may be facilitated.

As discussed above and shown in FIGS. 3, 4, and 5, sensor 104 may comprise a first circuit card assembly (CCA) 140 that includes a first IMU 150 and a second IMU 170, where the second IMU 170 is oriented to measure in different axial directions than the first IMU 150. The first IMU 150 may comprise an accelerometer capable of measuring linear accelerations in a first axis 152, a second axis 154, and a third axis 156 where each of the first axis 152, the second axis 154 and the third axis 156 are orthogonally oriented. The first IMU 150 may also comprise a gyroscope capable of measuring angular rates of rotation about the first axis 152, the second axis 154 and the third axis 156. Similarly, the second IMU 170 may comprise an accelerometer capable of measuring in a first axis 172, a second axis 174, and a third axis 176 where each of the first axis 172, the second axis 174 and the third axis 176 are orthogonally oriented. The second IMU 170 may also comprise a gyroscope capable of measuring angular rate of rotation about the first axis 172, the second axis 174 and the third axis 176. As discussed above, the first IMU 150 and the second IMU 170 may be in different orientations. For example, the third axis 156 of the first IMU 150 may be oriented substantially perpendicular to the third axis 176 of the second IMU 170 and the third axis 156 of the first IMU 150 may be oriented at a 45 degree angle to the first axis 172 and the second axis 174 of the second IMU 170. Similarly, the first axis 152 of the first IMU 150 may be positioned at a 45 degree angle from the first axis 172 and third axis 176 of the second IMU 170. Additionally, the first axis 152 and the second axis 154 may form a 45 degree angle with the third axis 176. The orientations of the first and second IMUS 150, 170 may be positioned such that a variety of combinations of measurement axes may be created.

Figure 4:
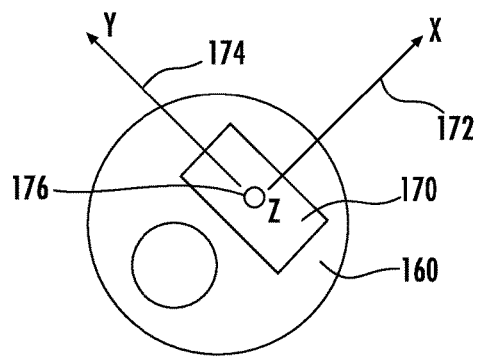
FIG. 4 depicts a top view of the circuit card assembly FIG. 3.
Figure 3:
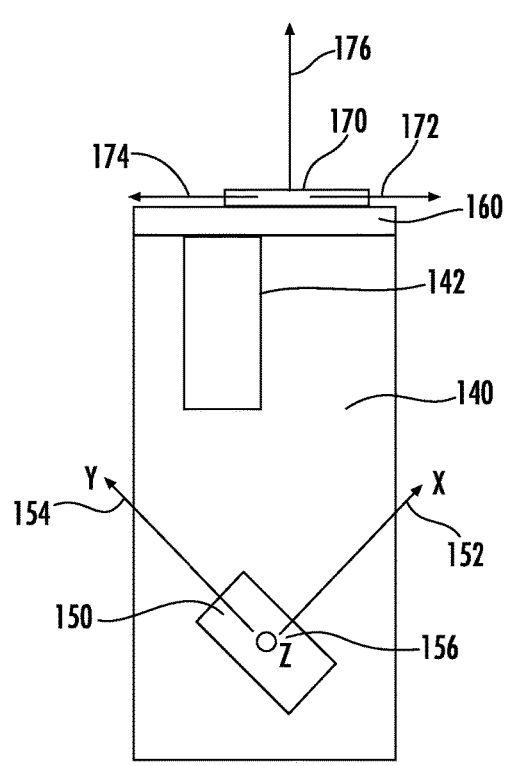
FIG. 3 depicts a front view of a circuit card assembly of an inertial measurement unit, according to one or more aspects described herein.
Figure 5:
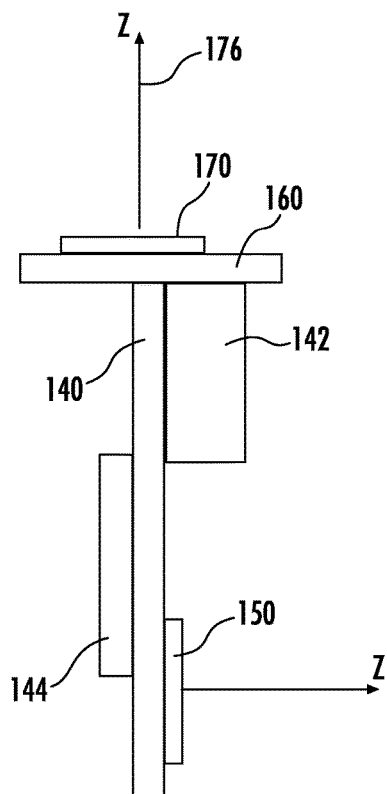
FIG. 5 depicts a side view of the circuit card assembly FIG. 3.

FIGS. 3, 4, and 5 show the components of sensor 104 which may comprise a first circuit card assembly (CCA) 140 with a first IMU 150, a second circuit card assembly (CCA) 160 with a second IMU 170, a processor 142, and a power source 144. The first CCA 140 may be connected to the second CCA 160 to enable the second CCA 160 to transmit the signals of the second IMU 170 to the processor 142 on the first CCA 140. The connection may be done with a flexible connector or a rigid connector, where a connector on the second CCA 160 may plug into a connector on the first CCA 140.

The first CCA 140 may have any shape and size, but may be preferably sized to have a width and length that may enable the sensor 104 to be small enough to fit within the butt end of a golf shaft 116. The first CCA 140 may have electronic components mounted on both sides to keep the size of the sensor 104 minimized. For example, the first CCA 140 may have a width of less than 13 mm. The length may be longer than the width and may have a length that at least twice as long as the width. Also, the first CCA 140 may have a surface area larger than the second CCA 160. Alternatively, the first CCA 140 may have a circular shape and have a diameter of less than 16 mm to fit near the end of the golf grip 118.

Additionally, the second CCA 160 may have any shape and size, but may be preferably sized to have a width and length that may enable the sensor 104 to be small enough to fit within the butt end of a golf shaft 116. The second CCA 160 may have electronic components mounted on both sides similar to the first CCA 140 to keep the size of the sensor 104 minimized. The second CCA 160 may have a width of less than 13 mm and may be circular in shape having a diameter less than 13 mm to complement the shape of the first CCA 140, such that the sensor 104 may fit into the butt end of a golf shaft 116 as shown in FIG. 2. Alternatively, the second CCA 160 may have a rectangular shape that connects to a side of the first CCA 140.

Keeping a proper alignment between the first IMU 150 and the second IMU 170 may help to ensure the sensor's accuracy. While it is possible to calibrate the sensor 104 after installation to minimize any misalignment errors between the first IMU 150 and the second IMU 170, in a mass production environment, it may be more cost effective to have a precisely controlled and repeatable mechanical assembly to ensure proper alignment and to ensure the accuracy of the sensor 104.

Orienting a first IMU 150 and second IMU 170 perpendicular to one another on a first CCA 140 and a second CCA 160 may require each CCA to be precisely mounted into a housing 120. The housing 120 may have substantially perpendicular surfaces that are manufactured with very tight tolerances. The first CCA 140 may be connected to a first surface and the second CCA 160 may be connected to the second surface oriented substantially perpendicular to each other. The first CCA 140 and the second CCA 160 may be then connected to each other using a flexible connector to transmit the electrical signals. By precisely mounting each CCA 140, 160 to different surfaces, the orientation between the IMUs 150, 170 may be precisely controlled and minimize the chance for misalignment. Alternatively, the first CCA 140 may be mounted to a housing surface and the second CCA 160 mounted directly to the first CCA 140 using a separate fixture to maintain the orientation or possible a rigid connector to both maintain the orientation and transmit the electrical signals. The CCAs 140, 160 may be connected to the housing 120 using mechanical means such as pins, fasteners, Wedge-Loks™, etc. Alternatively, the CCAs 140, 160 may be held in place with a potting compound or adhesive, or a combination of the two. Other connection means and mechanical means may be utilized without departing from these embodiments.

The processor 142 may be utilized to process data received from the first IMU 150 and the second IMU 170. The processor 142 may be a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. The processor 142 may also be implemented as a combination of computing devices, e.g., a combination of a DSP and a microprocessor, a plurality of microprocessors, one or more microprocessors in conjunction with a DSP core, or any other such configuration. The one or more implementations described throughout this disclosure may utilize logical blocks, modules, and circuits that may be implemented or performed with a processor.

The processor 142 may be used to implement various aspects and features described herein. As such, the processor 142 may be configured to perform any desired operation on one or more data streams received from the plurality of IMUs 150, 170. Further, it will be appreciated that the processor 142 may execute multiple calculations, in parallel or serial, at a very high throughput frequency using the received data from the sensor's components, in order to analyze a golf swing. As such, processor 142 may be configured to execute hundreds of thousands, millions, or billions or more calculations per second using the linear acceleration and angular rate data received from the IMUs 150, 170. Processor 142 may execute coordinate transformations, curve smoothing, noise filtering, outlier removal, amplification, and summation processes, and the like. In some examples, the sensor 104 may not utilize the processor 142 to process the data received from the IMUs 150, 170. Instead, the raw data from the sensor 104 may be communicated to one or more remote computing devices, such as devices 106 and 108, among others. The processor 142 may include a processing unit and system memory to store and execute software instructions.

The power source 144 may provide power to the sensor 104 including the processor 142, the first IMU 150, and the second IMU 170. The power source 144 may comprise, for example, a battery. The battery may be rechargeable and possibly removable.

As an alternate embodiment, the sensor 104 may have a single IMU 150 and an additional accelerometer or gyroscope oriented to measure about an axis oriented at an angle to at least one axis of the axes of the IMU 150. For example, the sensor 104 may have a first IMU 150 and at least one additional accelerometer oriented to measure linear accelerations in at least one axis oriented at an angle of approximately 45 degrees to at least one axis of the first IMU 150. As another alternate embodiment, sensor 104 may have a first IMU 150 and at least one additional gyroscope oriented to measure angular rates of rotation in an at least one axis oriented at an angle of approximately 45 degrees to at least one axis of the first IMU 150.

When the sensor 104 is positioned within the club head 114, the sensor 104 may be positioned so as to not interfere with the aerodynamics of the club 102. Moreover, club head 114 may be configured so that the masses and arrangement of the included components do not change the balance or center of gravity of the club head 114. In one implementation, the mass of the sensor 104 may be less than 7 grams, which may be less than 4% from the mass of an unmodified club head.

As discussed above, a sensor 104 may comprise a first IMU 150 and a second IMU 170 employed to generate data corresponding to the motion of a golf club 102 throughout a golf swing motion between a first time instant and a second time instant. In one example, the first time instant may correspond to a start of a golf swing motion, or may correspond to a predetermined instant prior to, or after, a detected start of a golf swing motion. Further, the second time instant may correspond to an end of a golf swing motion, or may correspond to a predetermined instant after, or before, a detected end of a golf swing motion, among others. As such, these predetermined times may include any time values, without departing from the scope of these disclosures. In turn, the IMU data may be processed to determine information about the motion of the golf club 102 throughout a swing.

Figure 6:
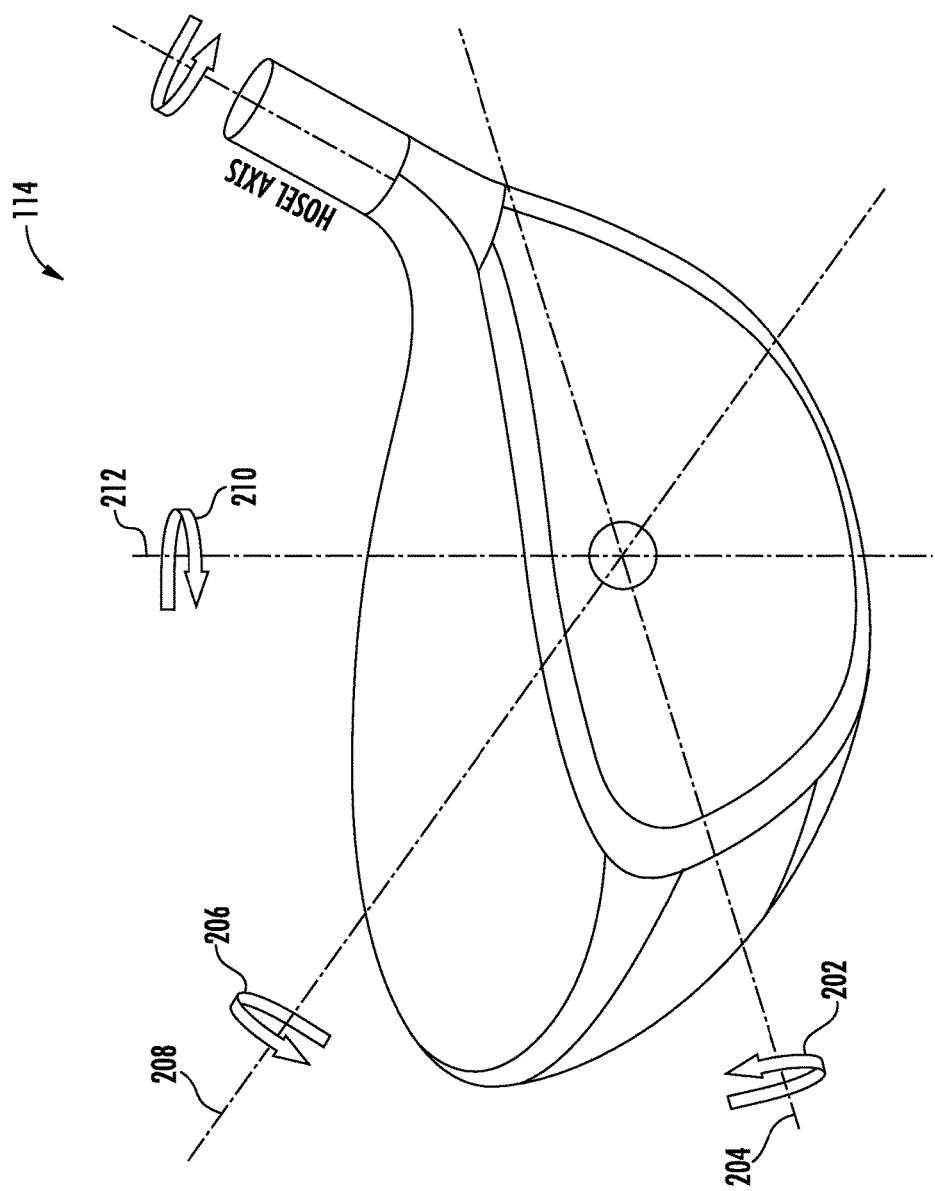
FIG. 6 schematically depicts a golf club head with orthogonal axes along and about which sensors may measure linear accelerations and angular velocities, according to one or more aspects described herein.

The sensor 104 may have a primary coordinate system corresponding to the first axis 152, the second axis 154, and the third axis 156. Depending upon the location and orientation of the sensor 104 on the golf club 102, the linear accelerations and angular rate data of the sensor 104 may be transformed into a Cartesian axes with an x-axis, y-axis, and z-axis, based around the orientation of golf club head to the ground. FIG. 6 schematically depicts a golf club head 114 with one implementation of Cartesian axes along and about which the sensor 104 data may be characterized. As illustrated in FIG. 6, Cartesian axes may be defined with an x-axis 204 parallel to the ground plane about which a rotation would correspond to a loft angle of the ball striking face of the golf club head 114, a y-axis 208 normal to the x-axis 204 about which a lie angle of the golf club head 114 might be measured, and a z-axis 212 normal to the x-axis 204 and the y-axis 208 about which a face angle of the golf club head 114 might be measured. Additionally, the rotations about these axes are shown as rotation 202 around the x-axis 204, rotation 206 around the y-axis 208, and rotation 210 around z-axis 212. By transforming the data into this coordinate system, the movements of the club head 114 can be tracked through the golf swing. Other definitions and/or orientations of the Cartesian axes may be utilized without departing from this disclosure, for example the Cartesian axes may be located on the shaft or under the grip. While club head 114 depicts a wood-type club, the same type of coordinate transformation may be made if the golf club head is an iron-type, hybrid-type, or putter.

Data from the sensor 104 may be utilized to mathematically describe the motion of a golf club 102 during a golf swing. This mathematical description may include one or more functions (e.g. functions with respect to time) that may be utilized to calculate the position of a golf club 102 at any given instant in time between defined start and end points of a golf swing. As such, these functions may be used to graphically plot a swing arc, among others (e.g. plot in three dimensions for display on a computer, such as one or more of devices 106 and 108). A graphical representation of a golf swing motion may be generated for display which may be a monitor display of device 106 or device 108. In one example, the calculated golf club location in the global coordinate system may be utilized to plot a graphical representation of the golf swing. Those of ordinary skill in the art will recognize specific processes for generating a graphical display, as well as specific hardware elements (GPUs, and the like), any of which may be utilized with the disclosures described herein. Further, various examples of specific graphics, such as swing path coloring and shading, among others, may be utilized without departing from these disclosures. In one example, the calculated golf swing data may be utilized to compare a user's golf swing to a database of stored swing data. This stored swing data may include previous swings from the user, or model swing data. As such, in one example, this model swing data may be based upon a golf swing of a professional level golfer, among others. Accordingly, the model swing data may be compared to the calculated swing data. The comparison may indicate one or more differences between the model swing data and the calculated swing data such that a user may be provided with feedback about his/her swing.

Accordingly, one or more processes may be executed to calculate a golf club 102 location as where the processor 142 or other device 106 or device 108 may receive the linear acceleration data and angular rate data generated by the IMUs. As discussed previously, the movements of the golf swing may sometimes cause one of the accelerometers or gyroscopes to reach the maximum measurement limit, or become "saturated." If the sensors 104 become saturated, the accuracy of the golf analysis system 100 is decreased.

Figure 7:
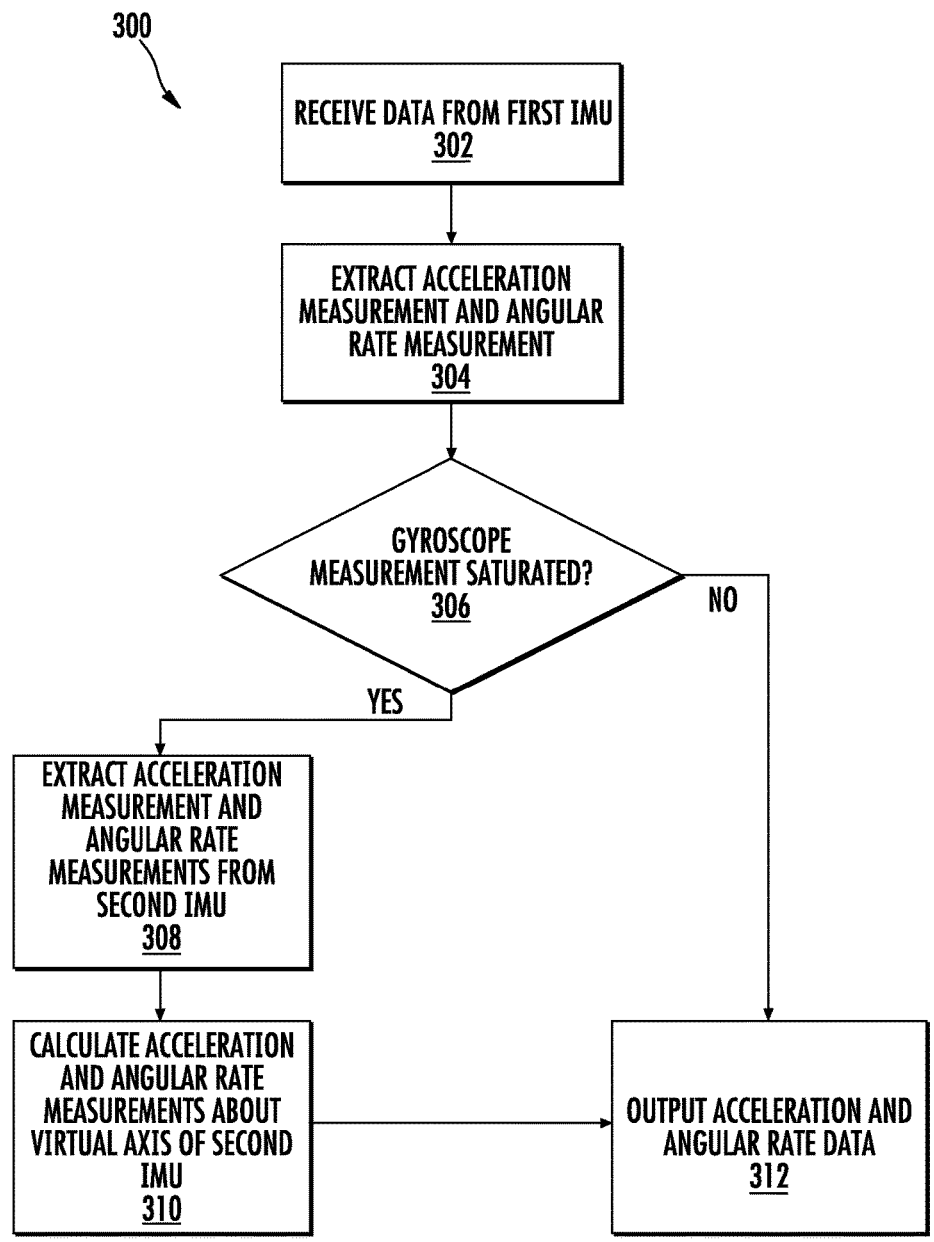
FIG. 7 is an illustrative flowchart diagram to compensate for saturation of the sensor measurement, according to one or more aspects described herein.

FIG. 7 shows process 300 that may be executed to address the "saturation" problem. As the linear acceleration and angular rate data from the first IMU 150 is received for a first time instant (302, 304), the data is compared to a predetermined set of parameters (306), that may include the saturation limits for the accelerometer and gyroscope inside the first IMU 150. If the data does not approach the saturation limits, the data is sent for further processing to determine the golf club's position and orientation in space (312). However, if any of the linear acceleration data or angular rate data from the first IMU 150 about any axis is approaching the saturation limit (306), the linear acceleration data and angular rate of rotation data is then received from the second IMU 170 (308). The data for the appropriate axes from the second IMU 170 may be calculated using a process comprising a 3×3 coordinate transformation matrix to create linear acceleration data and/or angular rate data about virtual axes having the same orientation as the axes of the first IMU 150 (310). Then, the appropriate linear acceleration or angular rate data of the virtual axis corresponding to the axis having the saturated data of the first IMU is then output for further processing to determine the golf club's position and orientation in space.

The 3×3 coordinate transformation may be represented by the equation below where xr, yr, and zr represent either the linear acceleration data or the angular rate data from the second IMU 170 depending upon which data from the first IMU 150 has become saturated. The xb, yb, and zb represent either the linear acceleration data or the angular rate data of the second IMU 170 transformed to a virtual axis oriented in the same direction as the axes 152, 154, and 156 of the first IMU150, where (xr, xb), (yr, yb), and (zr, zb) constitute the angle formed between the xr axis and the xb axis, yr axis and the yb axis, and zr axis and zb axis, respectively.

$$\begin{bmatrix} xb \\ yb \\ zb \end{bmatrix} = \begin{bmatrix} \cos(xr, xb) & \cos(yr, xb) & \cos(zr, xb) \\ \cos(xr, yb) & \cos(yr, yb) & \cos(zr, zb) \\ \cos(xr, zb) & \cos(yr, zb) & \cos(zr, zb) \end{bmatrix} \begin{bmatrix} xr \\ yr \\ zr \end{bmatrix} \quad \text{(Equation 1)}$$

Figure 8:
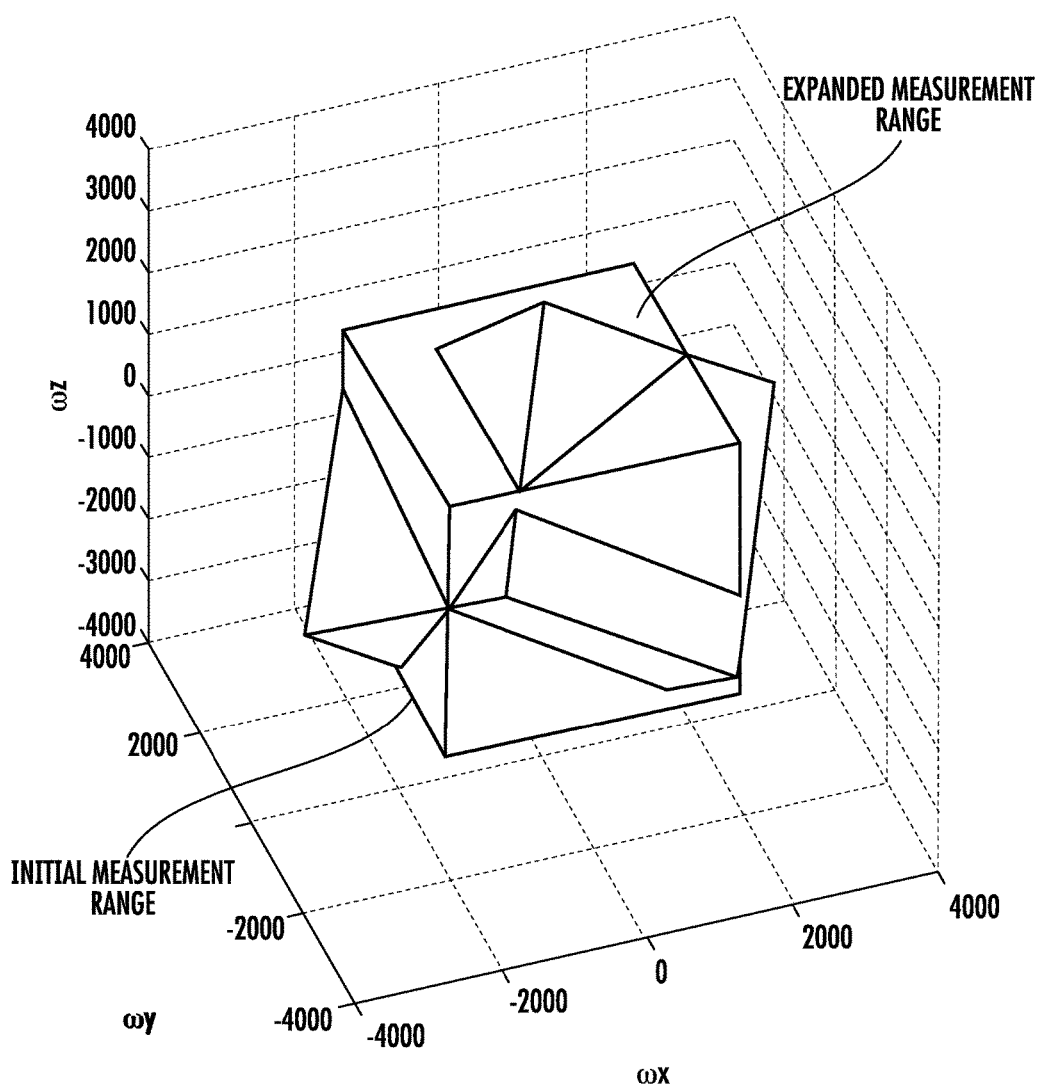
FIG. 8 is an illustrative graph of the measurement regime of an inertial measurement unit; according to one or more aspects described herein.

FIG. 8 shows an illustrative graph of the measurement regime of an IMU and the resulting increase in measurement capability based upon having a second IMU 170 oriented as described and using this process. The measurement range of the sensors 104 and IMUs 150, 170 may increase up to 40 percent. FIG. 8 shows a first cube that represents the initial measurement range and a second cube positioned on an angle extending out of the first cube that represents the expanded measurement range.

In addition to increasing the range of the sensors 104, the error caused by the gyroscopic bias drift may be reduced. MEMS-type gyroscopes may have a bias drift where the measurement may vary slightly over time. The gyroscopic bias drift is difficult to predict, which makes reducing this bias drift difficult. However, by using the measurements from the second IMU 170, and comparing these measurements of the first IMU 150, the bias drift may be easier estimated and thus accounted for to remove this error making the sensor's measurement more accurate.

Figure 9:
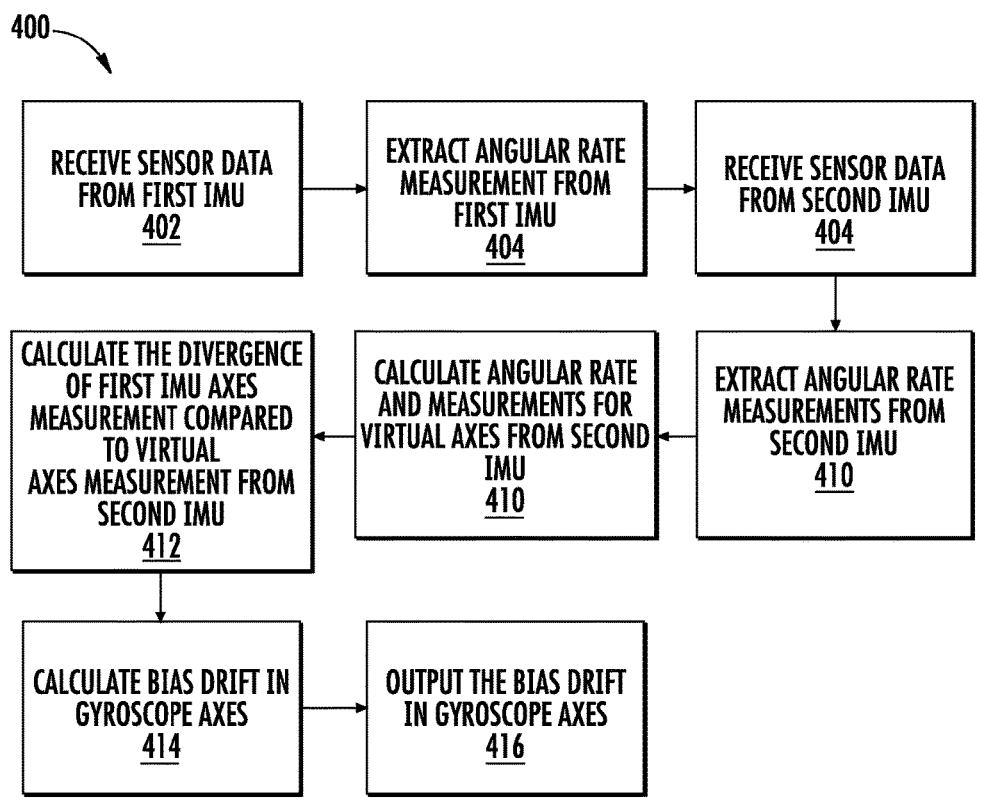
FIG. 9 is an illustrative flowchart diagram for reducing the gyroscopic bias drift error, according to one or more aspects described herein.

FIG. 9 shows a block diagram for a method 400 for calculating the gyroscopic bias drift within angular rate of rotation data of the gyroscopes within the IMUs 150, 170. The method may comprise: a processor receiving and extracting angular rate of rotation measurements about the first axis 152, the second axis 154, and the third axis 156 from the first IMU 150 (402, 404); receiving and extracting angular rate of rotation measurements about the first axis 172, the second axis 174, and the third axis 176 from the second IMU 170 (406, 408); calculating the angular rate of rotation measurements about a first virtual axis, a second virtual axis, and a third virtual axis, wherein the first virtual axis, the second virtual axis, and the third virtual axis may have the same orientation as the first axis 152, the second axis 154, and the third axis 156 of the first IMU 150 (410); calculating the divergence of the angular rate of rotation measurements about the first axis 152, the second axis 154, and the third axis 156 of the first IMU 150 and the angular rate of rotation measurements about the first virtual axis, the second virtual axis, and the third virtual axis (412); calculating the gyroscopic bias drift about each axis (414); and outputting the gyroscopic bias drift of each axis (416) of the first axis 152, second axis 154, and third axis 156.

The gyroscopic bias drift may be calculated using a filtering method. The angular rate of rotation data from the gyroscopes of IMUs 150 and 170 may be used to create two virtual gyroscopes that are then optimally filtered to create a single virtual gyroscope with angular rate of rotation measurements about the first, second, and third axes 152, 154, 156 or a first, second, and third axes of a coordinate system different than the coordinate systems of the IMUs 150, 170. Using this method, the sensor 104 may have less gyroscopic bias drift than if the sensor 104 only had a single IMU.

Additionally, the filtering method may be a Kalman filter applied over a discrete time to continually update the bias drift of the gyroscope. The Kalman filter may have gains derived from the specific characteristics of the IMUs 150, 170 implementation.

Another problem that can affect the accuracy of the sensor 104 is noise within the linear acceleration and angular rate measurements. The noise within the sensor 104 may be reduced by a factor of the square root of 2 using an average value of the linear acceleration and angular rate data of the first IMU 150 and the linear acceleration and angular rate data of the second IMU 170 transformed to the coordinate system of the first IMU 150.

Figure 10:
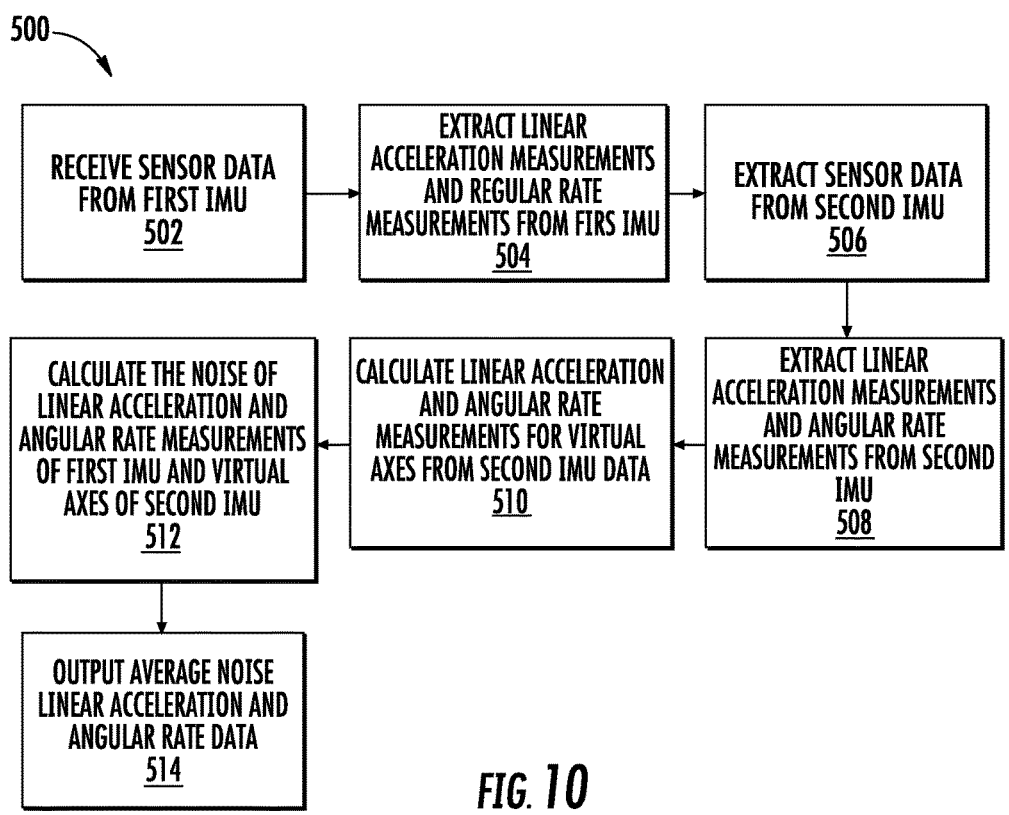
FIG. 10 is an illustrative flowchart diagram for reducing noise in the sensor, according to one or more aspects described herein.

FIG. 10 shows a block diagram for a method 500 for reducing the noise within the sensor 104. The method may comprise the processor 142: receiving and extracting linear acceleration and angular rate of rotation measurements about the first axis 152, the second axis 154, and the third axis 156 from the first IMU 150; where the first IMU 150 may be capable of measuring linear accelerations in the first axis 152, the second axis 154, and the third axis 156, and angular rates of rotation about the first axis 152, the second axis 154, and the third axis 156 (502, 504); receiving and extracting linear acceleration and angular rate of rotation measurements about the first axis 172, the second axis 174, and the third axis 176 from the second IMU 170; wherein the second IMU is capable of measuring linear accelerations in the first axis 172, the second axis 174, and the third axis 176 and angular rates of rotation about the first axis 172, the second axis 174, and the third axis 176 (506, 508); calculating the linear acceleration and angular rate of rotation measurements about a first virtual axis, a second virtual axis, and a third virtual axis, wherein the first virtual axis, the second virtual axis, and the third virtual axis have the same orientation as the first axis 152, the second axis 154, and the third axis 156 of the first IMU 150 (510); calculating the noise about the linear acceleration and the angular rate of rotation measurements about the first axis 152, the second axis 154, and the third axis 156 of the first IMU 150 and the noise about the linear acceleration and angular rate of rotation measurements about the first virtual axis, the second virtual axis, and the third virtual axis (512); and outputting an average noise the linear acceleration and the angular rate of rotation measurements (514).

Similar to the gyroscopic bias drift, the noise may be calculated using a filtering method, such as a Kalman filter applied over a discrete time to continually update the noise on the signals. The Kalman filter may have gains derived from the specific characteristics of the IMUs 150, 170 implementation. The linear acceleration and angular rate of rotation data from the multiple IMUs 150, 170 may be used to create linear acceleration and angular rate of rotation data for two virtual IMUs. This virtual IMU data may then be filtered to create the linear accelerations and angular rate of rotation measurements about the first, second, and third axes 152, 154, 156 that have less noise than using a single IMU.

As an alternate embodiment, the linear acceleration and angular rate of rotation data for the first IMU 150 may be transformed into a third coordinate system that is different than the axes 152, 154, 156 and the linear acceleration and angular rate of rotation data for second IMU 170 may be transformed into the third coordinate system that is different than the axes 172, 174, and 176. The data from each IMU 150, 170 may be then be combined using the techniques described above to find the linear accelerations and angular rates of rotation for a third coordinate system. The gyroscopic bias drift and noise may also be calculated for the third coordinate system using the same techniques described above.

Figures 11, 12:
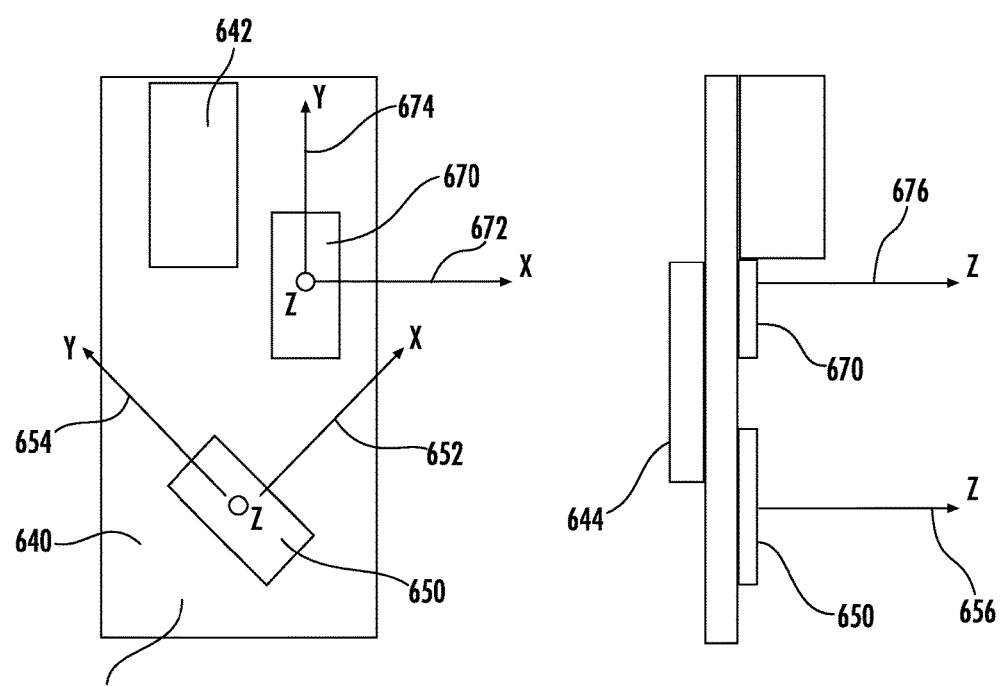
FIG. 11 depicts a front view of a circuit card assembly of an alternate embodiment of an inertial measurement unit, according to one or more aspects described herein.
FIG. 12 depicts a side view of the circuit card assembly FIG. 11.

An alternate embodiment to the embodiment shown in FIGS. 3-5, is shown in FIGS. 11 and 12. For embodiment of FIGS. 11-12, the features are referred to using similar reference numerals under the "6xx" series of reference numerals, rather than "1xx" as used in the embodiment of FIGS. 1-9. Accordingly, certain features of the sensor 604 that were already described above with respect to sensor 104 of FIGS. 1-9 may be described in lesser detail, or may not be described at all. In this alternate embodiment, the sensor 604 may comprise a single circuit card assembly (CCA) 640 having a processor 642, a power source 644, a first IMU 650, and a second IMU 670. The first IMU 650 may measure linear accelerations and angular rates of rotation corresponding three orthogonal axes, a first axis 652, a second axis 654, and a third axis 656. The second IMU 670 may measure linear accelerations and angular rates of rotation corresponding three orthogonal axes, a first axis 672, a second axis 674, and a third axis 676. The first IMU 650 and the second IMU 670 may be oriented to have at least 2 axes that are oriented at an angle of 45 degrees. For example, a first axis 652 and a second axis 654 are oriented at an angle of 45 degrees to a first axis 672 and a second axis 654. Because the IMUs 650, 670 are mounted within the same plane, a third axis 656 of the first IMU 650 is oriented in the same direction as the third axis 676 of the second IMU 670. Since this embodiment comprises a single circuit card 640, the size of the sensor 604 may be reduced.

Similar to the embodiment shown in FIGS. 3-5, the method to process and the data from the first IMU 650 and the second IMU 670 is similar for the embodiment shown in FIGS. 11 and 12. However, the resulting increase in measurement capability is different as shown in FIG. 13.

Figure 13:
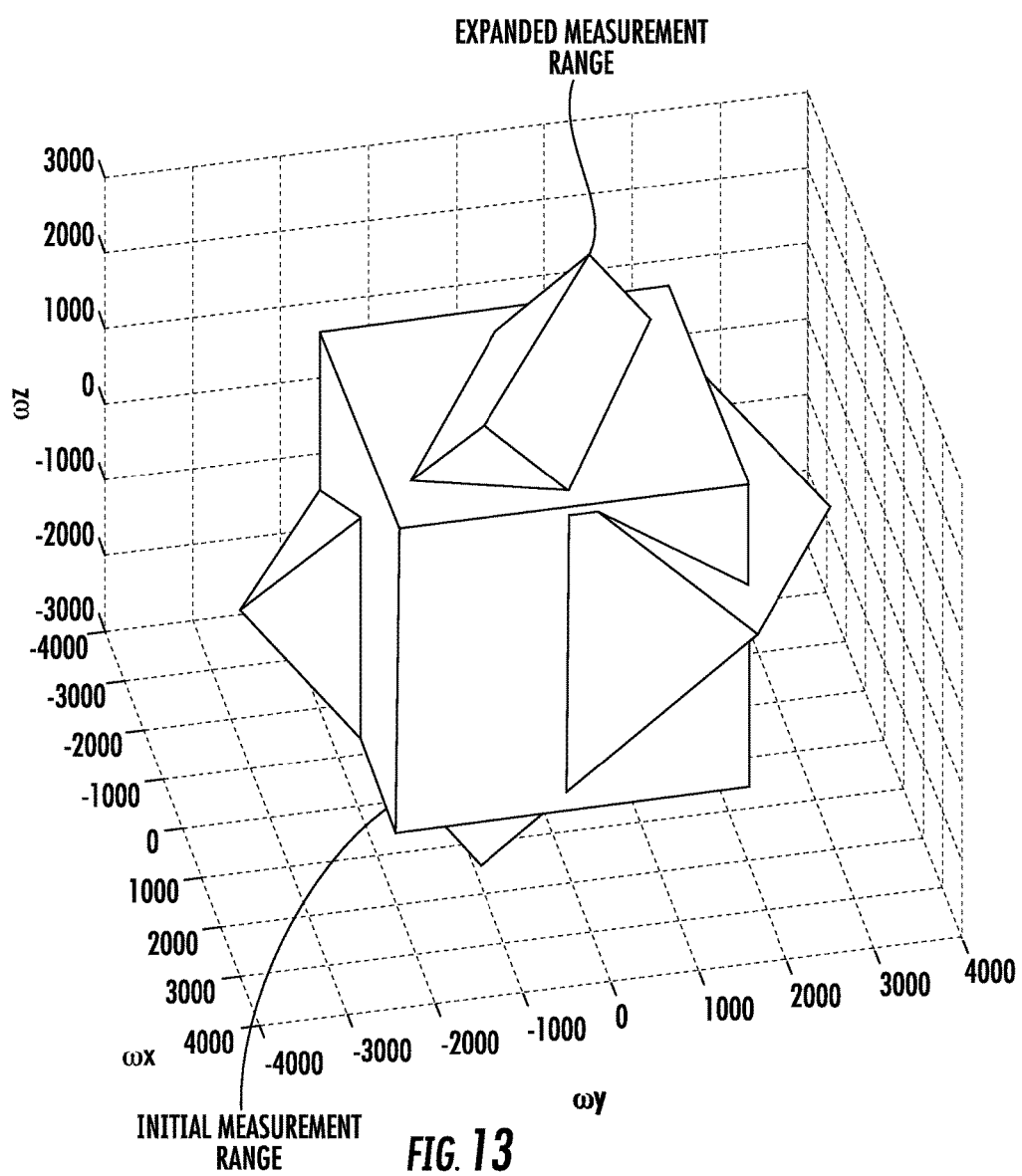
FIG. 13 is an illustrative graph of the measurement regime of an inertial measurement unit, according to one or more aspects described herein.

FIG. 13 shows an illustrative graph of the measurement regime of an IMU and the resulting increase in measurement capability based upon having a second IMU 670 and using this process. FIG. 13 shows a first cube that represents the initial measurement range and a second cube positioned on an angle extending out of the first cube that represents the expanded measurement range.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the art will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such, the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications.

As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

Accordingly, it will be understood that the invention is not to be limited to the embodiments disclosed herein, but is to be understood from the following claims, which are to be interpreted as broadly as allowed under the law.

What is claimed is:

1. A golf club comprising:
   a shaft and a golf club head, the shaft having a first end connected to the golf club head and a second end connected to a grip;
   a sensor connected to the golf club, the sensor comprising a first inertial measurement unit, a second inertial measurement unit, and a processor;
   a non-transitory, computer-readable medium storing computer-executable instructions that, when executed by the processor, causes the processor to at least:
   receive angular rate of rotation measurements about a first axis, a second axis, and a third axis from the first inertial measurement unit; wherein the first inertial measurement unit is capable of measuring linear accelerations in the first axis, the second axis, and the third axis and angular rates of rotation about the first axis, the second axis, and the third axis, wherein the first axis, the second axis, and the third axis are orthogonally oriented;
   compare the angular rate of rotation measurements from the first inertial measurement unit to a predetermined set of parameters;
   receive angular rate of rotation measurements about a fourth axis, a fifth axis, and a sixth axis from the second inertial measurement unit; wherein the second inertial measurement unit is capable of measuring linear accelerations in the fourth axis, the fifth axis, and the sixth axis and angular rates of rotation about the fourth axis, the fifth axis, and the sixth axis, wherein the fourth axis, the fifth axis, and the sixth axis are orthogonally oriented; and wherein the first axis and the second axis of the first inertial measurement unit are oriented at an angle of 45 degrees from the sixth axis of the second inertial measurement unit;
   calculate angular rate of rotation measurements about a first virtual axis, a second virtual axis, and a third virtual axis, wherein the first virtual axis, the second virtual axis, and the third virtual axis are the same orientation as the first axis, the second axis and the third axis of the first inertial measurement unit; and
   output the angular rate of rotation measurements of the first virtual axis, the second virtual axis, and the third virtual axis.

2. The golf club of claim 1, wherein at least one axis of the first inertial measurement unit is oriented in the same direction as at least one axis of the second inertial measurement unit.

3. The golf club of claim 1, wherein the predetermined set of parameters include a saturation limit for the angular rate of rotation measurements.

4. A golf club comprising:
   a shaft and a golf club head, the shaft having a first end connected to the golf club head and a second end connected to a grip;
   a sensor connected to the golf club, the sensor comprising a first inertial measurement unit, a second inertial measurement unit, and a processor;
   wherein the first inertial measurement unit is capable of measuring linear accelerations in a first axis, a second axis, and a third axis and angular rates of rotation about the first axis, the second axis, and the third axis, wherein the first axis, the second axis, and the third axis are orthogonally oriented;
   wherein the second inertial measurement unit is capable of measuring linear accelerations in a fourth axis, a fifth axis, and a sixth axis and angular rates of rotation about the fourth axis, the fifth axis, and the sixth axis, wherein the fourth axis, the fifth axis, and the sixth axis are orthogonally oriented;
   wherein the first axis and the second axis of the first inertial measurement unit are oriented at an angle of 45 degrees to the fourth axis and the fifth axis of the second inertial measurement unit; and
   a non-transitory, computer-readable medium storing computer-executable instructions that, when executed by the processor, causes the processor to at least:

receive angular rate of rotation measurements about a first axis, a second axis, and a third axis from a first inertial measurement unit;

compare the angular rate of rotation measurements from the first inertial measurement unit to a predetermined set of parameters;

receive angular rate of rotation measurements about a first axis, a second axis, and a third axis from a second inertial measurement unit;

calculate angular rate of rotation measurements about a first virtual axis, a second virtual axis, and a third virtual axis, wherein the first virtual axis, the second virtual axis, and the third virtual axis are the same orientation as the first axis, the second axis and the third axis of the first inertial measurement unit; and output the angular rate of rotation measurements of the first virtual axis, the second virtual axis, and the third virtual axis.

\* \* \* \* \*